United States Patent
Schauser et al.

(10) Patent No.: US 8,443,040 B2
(45) Date of Patent: *May 14, 2013

(54) METHOD AND SYSTEM FOR SYNCHRONIZING PRESENTATION OF A DYNAMIC DATA SET TO A PLURALITY OF NODES

(75) Inventors: Klaus E. Schauser, Goleta, CA (US); Bernd Oliver Christiansen, Santa Barbara, CA (US); Thorsten Von Eicken, Santa Barbara, CA (US); Albert Alexandrov, Goleta, CA (US); Rafael H. Saavedra, Santa Barbara, CA (US)

(73) Assignee: Citrix Systems Inc., Fort Lauderdale, FL (US)

( * ) Notice: Subject to any disclaimer, the term of this patent is extended or adjusted under 35 U.S.C. 154(b) by 577 days.

This patent is subject to a terminal disclaimer.

(21) Appl. No.: 10/908,802

(22) Filed: May 26, 2005

(65) Prior Publication Data
US 2007/0011356 A1   Jan. 11, 2007

(51) Int. Cl.
*G06F 15/16* (2006.01)
(52) U.S. Cl.
USPC .......................................................... 709/204
(58) Field of Classification Search .................. 709/204, 709/248
See application file for complete search history.

(56) References Cited

U.S. PATENT DOCUMENTS

| | | |
|---|---|---|
| 4,479,195 A | 10/1984 | Herr et al. |
| 4,650,929 A | 3/1987 | Boerger et al. |
| 4,748,618 A | 5/1988 | Brown et al. |
| 4,922,486 A | 5/1990 | Lidinsky et al. |
| 4,928,247 A | 5/1990 | Doyle et al. |
| 4,937,036 A | 6/1990 | Beard et al. |
| 4,965,819 A | 10/1990 | Kannes |
| 4,995,071 A | 2/1991 | Weber et al. |
| 5,072,412 A | 12/1991 | Henderson, Jr. et al. |
| 5,072,442 A | 12/1991 | Todd |
| 5,253,056 A | 10/1993 | Puri et al. |
| 5,293,470 A | 3/1994 | Birch et al. |

(Continued)

FOREIGN PATENT DOCUMENTS

| | | |
|---|---|---|
| EP | 1204277 A2 | 5/2002 |
| EP | 1286271 | 2/2003 |

(Continued)

OTHER PUBLICATIONS

International Searching Authority, "International Search Report," PCT Application No. PCT/US05/12078, mailed on Jan. 25, 2006, 3 pgs.

(Continued)

*Primary Examiner* — Jason Recek
(74) *Attorney, Agent, or Firm* — McDermott Will & Emery

(57) ABSTRACT

A method for synchronizing presentation of a dynamic data set to a plurality of nodes. The method includes the step of generating, by a consumer node in a plurality of nodes, a plurality of data packets representing a change to a dynamic data set. A host node in the plurality of nodes receives the plurality of data packets. The host node transmits to a synchronization engine the plurality of data packets. The synchronization engine generates metadata information representing the difference between the dynamic data set and the plurality of data packets. The synchronization engine transmits to the plurality of nodes the metadata information and the plurality of data packets.

21 Claims, 7 Drawing Sheets

U.S. PATENT DOCUMENTS

| | | | |
|---|---|---|---|
| 5,315,633 A | 5/1994 | Champa | |
| 5,357,511 A | 10/1994 | DiNapoli et al. | |
| 5,371,544 A | 12/1994 | Jacquin et al. | |
| 5,382,972 A | 1/1995 | Kannes | |
| 5,392,223 A | 2/1995 | Caci | |
| 5,392,284 A | 2/1995 | Sugiyama et al. | |
| 5,408,274 A | 4/1995 | Chang et al. | |
| 5,416,520 A | 5/1995 | Kuzma | |
| 5,446,491 A | 8/1995 | Shibata et al. | |
| 5,553,083 A | 9/1996 | Miller | |
| 5,586,257 A | 12/1996 | Perlman | |
| 5,689,666 A | 11/1997 | Berquist et al. | |
| 5,727,002 A | 3/1998 | Miller | |
| 5,758,110 A | 5/1998 | Boss et al. | |
| 5,764,235 A | 6/1998 | Hunt et al. | |
| 5,826,025 A | 10/1998 | Gramlich | |
| 5,838,664 A | 11/1998 | Polomski | |
| 5,845,265 A | 12/1998 | Woolston | |
| 5,896,500 A | 4/1999 | Ludwig et al. | |
| 5,909,559 A | 6/1999 | So | |
| 5,915,091 A * | 6/1999 | Ludwig et al. | 709/204 |
| 5,938,724 A | 8/1999 | Pommier et al. | |
| 5,956,027 A | 9/1999 | Krishnamurthy | |
| 5,990,852 A | 11/1999 | Szamrej | |
| 6,016,535 A | 1/2000 | Krantz et al. | |
| 6,081,829 A | 6/2000 | Sidana | |
| 6,105,055 A * | 8/2000 | Pizano et al. | 709/204 |
| 6,112,085 A | 8/2000 | Garner et al. | |
| 6,155,840 A | 12/2000 | Sallette | |
| 6,157,935 A | 12/2000 | Tran et al. | |
| 6,167,432 A | 12/2000 | Jiang | |
| 6,202,060 B1 | 3/2001 | Tran | |
| 6,226,618 B1 | 5/2001 | Downs et al. | |
| 6,233,606 B1 | 5/2001 | Dujari | |
| 6,246,758 B1 | 6/2001 | Low | |
| 6,249,291 B1 | 6/2001 | Popp et al. | |
| 6,256,773 B1 | 7/2001 | Bowman-Amuah | |
| 6,289,382 B1 | 9/2001 | Bowman-Amuah | |
| 6,295,551 B1 | 9/2001 | Roberts et al. | |
| 6,308,199 B1 | 10/2001 | Katsurabayashi et al. | |
| 6,324,647 B1 | 11/2001 | Bowman-Amuah | |
| 6,329,984 B1 | 12/2001 | Boss et al. | |
| 6,332,163 B1 | 12/2001 | Bowman-Amuah | |
| 6,339,832 B1 | 1/2002 | Bowman-Amuah | |
| 6,343,313 B1 | 1/2002 | Salesky et al. | |
| 6,370,573 B1 | 4/2002 | Bowman-Amuah | |
| 6,397,036 B1 | 5/2002 | Thean et al. | |
| 6,400,996 B1 | 6/2002 | Hoffberg et al. | |
| 6,405,364 B1 | 6/2002 | Bowman-Amuah | |
| 6,430,567 B2 | 8/2002 | Burridge | |
| 6,434,568 B1 | 8/2002 | Bowman-Amuah | |
| 6,434,628 B1 | 8/2002 | Bowman-Amuah | |
| 6,438,594 B1 | 8/2002 | Bowman-Amuah | |
| 6,442,748 B1 | 8/2002 | Bowman-Amuah | |
| 6,473,794 B1 | 10/2002 | Guheen et al. | |
| 6,477,580 B1 | 11/2002 | Bowman-Amuah | |
| 6,477,665 B1 | 11/2002 | Bowman-Amuah | |
| 6,496,850 B1 | 12/2002 | Bowman-Amuah | |
| 6,502,213 B1 | 12/2002 | Bowman-Amuah | |
| 6,514,085 B2 | 2/2003 | Slattery et al. | |
| 6,519,571 B1 | 2/2003 | Guheen et al. | |
| 6,529,909 B1 | 3/2003 | Bowman-Amuah | |
| 6,529,948 B1 | 3/2003 | Bowman-Amuah | |
| 6,536,037 B1 | 3/2003 | Guheen et al. | |
| 6,539,396 B1 | 3/2003 | Bowman-Amuah | |
| 6,549,949 B1 | 4/2003 | Bowman-Amuah | |
| 6,550,057 B1 | 4/2003 | Bowman-Amuah | |
| 6,567,813 B1 | 5/2003 | Zhu et al. | |
| 6,570,590 B1 | 5/2003 | Dubrow et al. | |
| 6,571,282 B1 | 5/2003 | Bowman-Amuah | |
| 6,573,907 B1 | 6/2003 | Madrane et al. | |
| 6,578,068 B1 | 6/2003 | Bowman-Amuah | |
| 6,584,493 B1 | 6/2003 | Butler | |
| 6,584,569 B2 | 6/2003 | Reshef et al. | |
| 6,601,087 B1 | 7/2003 | Zhu et al. | |
| 6,601,192 B1 | 7/2003 | Bowman-Amuah | |
| 6,601,234 B1 | 7/2003 | Bowman-Amuah | |
| 6,606,660 B1 | 8/2003 | Bowman-Amuah | |
| 6,606,744 B1 | 8/2003 | Mikurak | |
| 6,615,166 B1 | 9/2003 | Guheen et al. | |
| 6,615,199 B1 | 9/2003 | Bowman-Amuah | |
| 6,615,253 B1 | 9/2003 | Bowman-Amuah | |
| 6,629,081 B1 | 9/2003 | Cornelius et al. | |
| 6,636,242 B2 | 10/2003 | Bowman-Amuah | |
| 6,640,145 B2 | 10/2003 | Hoffberg et al. | |
| 6,640,238 B1 | 10/2003 | Bowman-Amuah | |
| 6,640,244 B1 | 10/2003 | Bowman-Amuah | |
| 6,640,249 B1 | 10/2003 | Bowman-Amuah | |
| 6,654,032 B1 | 11/2003 | Zhu et al. | |
| 6,662,357 B1 | 12/2003 | Bowman-Amuah | |
| 6,669,485 B2 | 12/2003 | Thean et al. | |
| 6,671,818 B1 | 12/2003 | Mikurak | |
| 6,697,824 B1 | 2/2004 | Bowman-Amuah | |
| 6,701,345 B1 | 3/2004 | Carley et al. | |
| 6,715,145 B1 | 3/2004 | Bowman-Amuah | |
| 6,721,713 B1 | 4/2004 | Guheen et al. | |
| 6,742,015 B1 | 5/2004 | Bowman-Amuah | |
| 6,792,615 B1 | 9/2004 | Rowe et al. | |
| RE38,609 E | 10/2004 | Chen et al. | |
| 6,842,906 B1 | 1/2005 | Bowman-Amuah | |
| 6,850,252 B1 | 2/2005 | Hoffberg | |
| 6,856,651 B2 | 2/2005 | Singh | |
| 6,877,043 B2 | 4/2005 | Mallory et al. | |
| 6,882,634 B2 | 4/2005 | Bagchi et al. | |
| 6,888,844 B2 | 5/2005 | Mallory et al. | |
| 6,891,881 B2 | 5/2005 | Trachewsky et al. | |
| 6,898,204 B2 | 5/2005 | Trachewsky et al. | |
| 6,904,449 B1 | 6/2005 | Quinones | |
| 6,918,113 B2 | 7/2005 | Patel et al. | |
| 6,954,800 B2 | 10/2005 | Mallory | |
| 6,957,186 B1 | 10/2005 | Guheen et al. | |
| 6,975,655 B2 | 12/2005 | Fischer et al. | |
| 6,988,236 B2 | 1/2006 | Ptasinski et al. | |
| 6,993,101 B2 | 1/2006 | Trachewsky et al. | |
| 7,000,031 B2 | 2/2006 | Fischer et al. | |
| 7,006,881 B1 | 2/2006 | Hoffberg et al. | |
| 7,013,327 B1 | 3/2006 | Hickman et al. | |
| 7,023,979 B1 | 4/2006 | Wu et al. | |
| 7,028,266 B2 | 4/2006 | Ben-Shachar et al. | |
| 7,035,285 B2 | 4/2006 | Holloway et al. | |
| 7,043,716 B2 | 5/2006 | Zimmer et al. | |
| 7,069,234 B1 | 6/2006 | Cornelius et al. | |
| 7,070,098 B1 | 7/2006 | Lapstun et al. | |
| 7,076,736 B2 | 7/2006 | Hugh | |
| 7,113,934 B2 | 9/2006 | Levesque et al. | |
| 7,124,101 B1 | 10/2006 | Mikurak | |
| 7,128,270 B2 | 10/2006 | Silverbrook et al. | |
| 7,130,807 B1 | 10/2006 | Mikurak | |
| 7,139,999 B2 | 11/2006 | Bowman-Amuah | |
| 7,143,177 B1 * | 11/2006 | Johnson et al. | 709/231 |
| 7,146,053 B1 | 12/2006 | Rijavec et al. | |
| 7,149,698 B2 | 12/2006 | Guheen et al. | |
| 7,154,638 B1 | 12/2006 | Lapstun et al. | |
| 7,165,041 B1 | 1/2007 | Guheen et al. | |
| 7,167,844 B1 | 1/2007 | Leong et al. | |
| 7,185,075 B1 | 2/2007 | Mishra et al. | |
| 7,197,535 B2 | 3/2007 | Salesky et al. | |
| 7,200,804 B1 | 4/2007 | Khavari et al. | |
| 7,222,780 B2 | 5/2007 | Lapstun et al. | |
| 7,224,847 B2 * | 5/2007 | Zhang et al. | 382/254 |
| 7,225,244 B2 | 5/2007 | Reynolds et al. | |
| 7,233,592 B1 | 6/2007 | Oi et al. | |
| 7,305,436 B2 * | 12/2007 | Willis | 709/204 |
| 7,310,675 B2 | 12/2007 | Salesky et al. | |
| 7,369,515 B2 | 5/2008 | Salesky et al. | |
| 7,418,476 B2 | 8/2008 | Salesky et al. | |
| 7,426,191 B2 | 9/2008 | Salesky et al. | |
| 7,451,181 B2 | 11/2008 | Sasaki et al. | |
| 7,484,208 B1 | 1/2009 | Nelson | |
| 7,593,987 B2 | 9/2009 | Salesky et al. | |
| 7,613,834 B1 * | 11/2009 | Pallipuram et al. | 709/248 |
| 7,627,663 B2 | 12/2009 | Salesky et al. | |
| 7,715,331 B2 | 5/2010 | Salesky et al. | |
| 7,716,344 B2 | 5/2010 | Salesky et al. | |
| 7,813,304 B2 | 10/2010 | Salesky et al. | |

| | | |
|---|---|---|
| 7,822,859 B2 | 10/2010 | Salesky et al. |
| 7,836,163 B2 | 11/2010 | Salesky et al. |
| 7,877,489 B2 | 1/2011 | Salesky et al. |
| 7,934,002 B2 | 4/2011 | Salesky et al. |
| 2001/0054180 A1* | 12/2001 | Atkinson .................. 725/32 |
| 2002/0038346 A1 | 3/2002 | Morrison et al. |
| 2002/0049608 A1 | 4/2002 | Hartsell et al. |
| 2002/0049818 A1 | 4/2002 | Gilhuly et al. |
| 2002/0049841 A1 | 4/2002 | Johnson et al. |
| 2002/0059274 A1 | 5/2002 | Hartsell et al. |
| 2002/0065864 A1 | 5/2002 | Hartsell et al. |
| 2002/0073059 A1 | 6/2002 | Foster et al. |
| 2002/0083183 A1 | 6/2002 | Pujare et al. |
| 2002/0099774 A1 | 7/2002 | Yamato et al. |
| 2002/0129106 A1 | 9/2002 | Gutfreund |
| 2002/0154244 A1 | 10/2002 | Nakagawa et al. |
| 2002/0174180 A1* | 11/2002 | Brown et al. ............ 709/203 |
| 2002/0174227 A1 | 11/2002 | Hartsell et al. |
| 2003/0009538 A1 | 1/2003 | Shah et al. |
| 2003/0050987 A1 | 3/2003 | Lazaridis et al. |
| 2003/0055896 A1 | 3/2003 | Hu et al. |
| 2003/0085922 A1 | 5/2003 | Wei |
| 2003/0140121 A1 | 7/2003 | Adams |
| 2003/0140159 A1 | 7/2003 | Campbell |
| 2003/0160813 A1 | 8/2003 | Raju |
| 2003/0167301 A1 | 9/2003 | Zhu et al. |
| 2003/0167302 A1 | 9/2003 | Zhu et al. |
| 2003/0167303 A1 | 9/2003 | Zhu et al. |
| 2003/0167304 A1 | 9/2003 | Zhu et al. |
| 2003/0167305 A1 | 9/2003 | Zhu et al. |
| 2003/0167339 A1 | 9/2003 | Zhu et al. |
| 2003/0167418 A1 | 9/2003 | Zhu et al. |
| 2003/0182375 A1 | 9/2003 | Zhu et al. |
| 2003/0189601 A1 | 10/2003 | Ben-Shachar et al. |
| 2003/0191812 A1 | 10/2003 | Agarwalla et al. |
| 2003/0208529 A1 | 11/2003 | Pendyala et al. |
| 2003/0217171 A1 | 11/2003 | Von Stuermer et al. |
| 2004/0002048 A1 | 1/2004 | Thurmaier et al. |
| 2004/0024890 A1 | 2/2004 | Baek et al. ............ 709/229 |
| 2004/0031058 A1 | 2/2004 | Reisman |
| 2004/0049549 A1 | 3/2004 | Slattery et al. |
| 2004/0098398 A1* | 5/2004 | Ahn et al. ............ 707/100 |
| 2004/0103147 A1 | 5/2004 | Flesher et al. |
| 2004/0107249 A1 | 6/2004 | Moser et al. |
| 2004/0107256 A1 | 6/2004 | Odenwald et al. |
| 2004/0111639 A1 | 6/2004 | Schwartz et al. |
| 2004/0174392 A1 | 9/2004 | Bjoernsen et al. |
| 2004/0190092 A1 | 9/2004 | Silverbrook et al. |
| 2004/0191748 A1 | 9/2004 | Thean et al. |
| 2004/0236830 A1* | 11/2004 | Nelson et al. ............ 709/204 |
| 2005/0003841 A1* | 1/2005 | Salo et al. ............ 455/502 |
| 2005/0044089 A1 | 2/2005 | Wu et al. |
| 2005/0044108 A1 | 2/2005 | Shah et al. |
| 2005/0050053 A1 | 3/2005 | Thompson |
| 2005/0060656 A1 | 3/2005 | Martinez et al. |
| 2005/0063083 A1 | 3/2005 | Dart et al. |
| 2005/0080850 A1 | 4/2005 | Salesky et al. |
| 2005/0086384 A1* | 4/2005 | Ernst ............ 709/248 |
| 2005/0132299 A1 | 6/2005 | Jones et al. ............ 715/759 |
| 2005/0144186 A1 | 6/2005 | Hesselink et al. |
| 2005/0149481 A1 | 7/2005 | Hesselink et al. |
| 2005/0246389 A1* | 11/2005 | Shah et al. ............ 707/200 |
| 2005/0286466 A1 | 12/2005 | Tagg et al. |
| 2006/0064716 A1 | 3/2006 | Sull et al. |
| 2006/0161671 A1 | 7/2006 | Ryman et al. |
| 2006/0206533 A1* | 9/2006 | MacLaurin et al. ......... 707/200 |
| 2006/0253540 A1* | 11/2006 | Hughes ............ 709/207 |
| 2008/0133660 A1 | 6/2008 | Salesky et al. |
| 2008/0133661 A1 | 6/2008 | Salesky et al. |
| 2008/0133769 A1 | 6/2008 | Salesky et al. |
| 2008/0183807 A1 | 7/2008 | Salesky et al. |
| 2008/0183808 A1 | 7/2008 | Salesky et al. |
| 2009/0125904 A1 | 5/2009 | Nelson |
| 2010/0306674 A1 | 12/2010 | Salesky et al. |

FOREIGN PATENT DOCUMENTS

| | | |
|---|---|---|
| EP | 1460851 | 9/2004 |
| GB | 2300551 | 11/1996 |
| WO | WO-03013679 A1 | 2/2003 |
| WO | WO-2004/072804 | 8/2004 |

OTHER PUBLICATIONS

International Searching Authority, "Written Opinion," PCT Application No. PCT/US05/12078, mailed on Jan. 25, 2006, 7 pgs.

Written Opinion for PCT Application No. PCT/US2006/019540, mailed on Dec. 20, 2006, 6 pgs.

Cabri et al., "Supporting cooperative WWW browsing: a proxy based approach," Proceedings Euromicro Workshop on Parallel and Distributed Processing, Feb. 3, 1999, 8 pages.

Gharavi, H and Partrovi, M.H., "Video Coding and Distribution Over ATM for Multipoint Teleconferencing," IEEE, 1993, pp. 1-7.

Gorokhovsky, V. et al. "Layered Windows—A New Way to Use Translucency and Transparency Effects in Windows Applications" [online], Retrieved from the Internet: <URL: http://msdn.microsoft.com/library/default.asp?url=/library/en-us/dnwui/html/layerwin.asp>, retrieved on Oct. 24, 2006, 4 pgs.

Horn, et al., "A Standards-Based Multimedia Conferencing Bridge," AT&T Techn. Jour., 1993, pp. 41-49.

Krause, R., "Indeo, H.320 Silicon Pursued," Electronic News, vol. 40, No. 2023, 1991, pp. 1-2.

"Video Codec Chip Set Provides MPEG, P*64, and JPEG Compliance," Electrical Design News, vol. 37, No. 9, 1992, pp. 103-104.

Partial International Search for PCT Application No. PCT/US2006/019368, mailed on Nov. 13, 2006, 3 pgs.

International Search Report for PCT Application No. PCT/US2006/019370, mailed on Sep. 26, 2006, 4 pgs.

Written Opinion of the International Searching Authority for PCT Application No. PCT/US2006/019370, mailed on Sep. 26, 2006, 7 pgs.

International Search Report for PCT Application No. PCT/US2006/019540, mailed on Dec. 20, 2006, 2 pgs.

International Search Report for PCT Application No. PCT/US2005/011905, mailed Jul. 25, 2005, 3 pages.

Written Opinion for PCT Application No. PCT/US2005/011905, mailed Jul. 25, 2005, 6 pages.

International Search Report for PCT Application No. PCT/US2006/019368, mailed Nov. 14, 2007, 5 pages.

Written Opinion for PCT Application No. PCT/US2006/019368, mailed Nov. 14, 2007, 7 pages.

Examination Report issued in European Patent Application No. 06760217.7, mailed Oct. 22, 2008, 3 pages.

Examination Report issued in Australian Patent Application No. 2005239573, mailed Sep. 5, 2008, 2 pages.

Examination Report issued in Australian Patent Application No. 2005239573, mailed Nov. 20, 2008, 2 pages.

Examination Report issued in Australian Patent Application No. 2005239573, mailed Jun. 25, 2009, 16 pages.

Supplemental European Search Report issued in European Patent Application No. 05736265.9, mailed Jun. 18, 2009, 6 pages.

Examination Report issued in European Patent Application No. 05736265.9, mailed Oct. 26, 2009, 7 pages.

Examination Report issued in Australian Patent Application No. 2006251764, mailed Feb. 4, 2010, 8 pages.

Examination Report issued in European Patent Application No. 06760217.7, mailed Sep. 23, 2010, 7 pages.

U.S. Appl. No. 09/523,315, filed Mar. 10, 2000, Salesky.

U.S. Appl. No. 60/014,242, filed Mar. 26, 1996, Salesky.

"CU-SeeMe Software Product," Brought to you by the Cu-SeeMe Development Team of the Advanced Technologies and Planning group of the Network Resources Division of Cornell Information Technologies, pp. 1-8 (1995).

"ORCA Video Conferencing System", Manual Written by the National Oceanic and Atmospheric Administration's Office of Ocean Resources Conservation and Assessment for Operation of the CU-SeeMe System, 26 pages (1995).

Abdel-Waha et al., "XTV: A Framework for Sharing X Window Clients in Remote Synchronous Collaboration," IEEE Conference, pp. 1-15 (1991).

Chen et al., "Real Time Video and Audio in the World Wide Web", 1995.

Bolot et al., "Scalable Feedback Control for Multicast Video Distribution in the Internet," SIGCOMM 94, London England, pp. 58-67 (1994).

Cox, "Global Schoolhouse Project," http://www.virtualschool.edu/mon/academia (2010).

Crowley et al., "MMConf: An Infrastructure for Building Shared Multimedia Applications," Proceedings of the 1990 ACM Conference on Computer—Supported Cooperative Work, pp. 329-342 (1990).

Delgrossi et al., "Media Scaling for Audiovisual Communication with the Heidelberg Transport System," Conference Proceedings of the first ACM International Conference on Multimedia, pp. 99-104 (1993).

Dorcey, "CU-SeeMe Desktop Videoconferencing Software," Connexions the Interoperability Report, 9: 42-45 (1995).

Ensor et al., "Control Issues in Multimedia Conferencing," IEEE Conference, pp. 133-143 (1991).

Ensor et al., "The Rapport Multimedia Conferencing System—A Software Overview," Proceedings of the 2nd IEEE Conference, pp. 52-58 (1988).

Maly et al., "Mosaic + XTV = CoReview," Computer Networks and ISDN Systems, pp. 1-19 1995.

McCanne et al., "Receiver-Driven Layered Multicast," ACM SIGCOMM, pp. 1-14 (1996).

Sattler, "Internet TV with CU-SeeMe", Book, 323 pages (1995).

Savetz et al., "MBONE: Multicasting Tomorrow's Internet," IDG Books Worldwide, Inc., (1996).

US 5,715,404, 02/1998, Katseff et al. (withdrawn)

\* cited by examiner

METHOD AND SYSTEM FOR SYNCHRONIZING PRESENTATION OF A DYNAMIC DATA SET TO A PLURALITY OF NODES

FIELD OF THE INVENTION

The present invention relates generally to synchronization of source node and consumer node data sets and, more particularly, to techniques and apparatus for synchronizing presentation of a dynamic data set to a plurality of nodes.

BACKGROUND OF THE INVENTION

The promise of using the global computer network, colloquially referred to as the Internet, to allow many different individuals from disparate geographic and temporal regions to communicate and collaborate in real-time or near real-time remain largely unfulfilled. Differing bandwidths of different connections result in difficulties sharing time-sensitive information. The simplest example of this effect is "screen sharing," that is, updating the screens of multiple clients such that each one mirrors a server's screen as closely as possible. Either screen updates are limited to the speed of the slowest connection, or users communicating over lower-bandwidth connections are "left behind" by those with higher-bandwidth connections. Further, in order to be useful, a system should support several simultaneous information sources and many information consumers, e.g., one or more screen broadcasts to hundreds of viewers. Additionally, a system should allow information consumers to "join late," that is, to begin receiving information from the information source at a point in time later than the beginning of the information flow.

Some attempts at solving this problem rely on a central server to analyze the information traffic and route traffic between information sources and information consumers. Although these techniques are moderately successful, use of a central server to make decisions based on the content of the routed information destroys the confidentiality of the routed information, which is unacceptable.

BRIEF SUMMARY OF THE INVENTION

The present invention enables synchronization of dynamic data sets to multiple consumer nodes. The system fully utilizes the bandwidth available to each consumer node and is simple, efficient, and reliable. The system also has the ability to host multiple one-to-many sessions, allows consumer nodes to join an ongoing one-to-many session at any time, and enables consumer nodes to annotates data and transmission of the annotation to all nodes in the session. The system also supports end-to-end encryption of data.

In one aspect the present invention relates to a method for synchronizing presentation of a dynamic data set to a plurality of nodes. A consumer node in the plurality of nodes generates a plurality of data packets representing a change to a dynamic data set. A host node in the plurality of nodes receives the plurality of data packets. The host node transmits the received plurality of data packets to a synchronization engine. The synchronization engine generates metadata information representing the difference between the dynamic data set and the plurality of data packets. The synchronization engine transmits to the plurality of nodes the metadata information and the plurality of data packets.

In some embodiments, a request for the current state of the changing data set is received by the synchronization engine. In other embodiments, the host node receives and transmits the plurality of data packets in an encrypted form.

In another aspect, the invention relates to a system for synchronizing presentation of a dynamic data set to a plurality of nodes. The system includes a consumer node and a communications service. The consumer node transmits at least one metadata packet identifying a plurality of data packets that represent a current state of a dynamic data set and transmitting at least one of the identified packets. The communications service is in communication with the consumer node and selects one of the at least one metadata packets and the least one data packet for transmission to a host node in a plurality of nodes.

In some embodiments, a second node in the plurality of nodes requests a current state of the dynamic data set from the communication service. In one of these embodiments, the communication service selects one of the at least one metadata packets and the at least one data packet in response to the request made by the second node.

In still another aspect, the present invention relates to a communications service synchronizing presentation of a dynamic data set to a plurality of nodes. The communications service includes a receiving subsystem, a synchronization engine, and a transmission subsystem. The receiving subsystem receives at least one metadata packet identifying at least one data packet representing a current state of a dynamic data set and at least one data packet identified by the received at least one metadata packet. The synchronization engine selects one of the at least one metadata packet and the at least one data packet. The transmission subsystem transmits the selected one of the at least one metadata packet and the at least one data packet. In some embodiments, the communications service also includes a memory element. In still other embodiments, the synchronization engine selects one of the at least one metadata packet and the at least one data packet in response to a request received from a consumer node.

In yet another aspect, the present invention relates to a node presenting a dynamic data set. The node includes an interception subsystem, a transceiver subsystem, and a display subsystem. The interception subsystem acquires at least one input from a human interface device, the input representing a change to a dynamic data set. The transceiver subsystem transmits the at least one input to a synchronization engine for presentation to a plurality of nodes and receiving from the synchronization engine a plurality of data packets representing a second change to the dynamic data set. The display subsystem, in communication with the transceiver subsystem, receives the plurality of data packets and displays the plurality of data packets to a user of the node. In one embodiment, the interception subsystem further comprises a mouse listener. In another embodiment, the interception subsystem further comprises acquiring at least one input representing a change to a presentation. In still another embodiment, the display subsystem further comprises displaying to the user a cursor represented by an icon selected from a plurality of icons, responsive to the plurality of data packets.

BRIEF DESCRIPTION OF THE DRAWINGS

These and other aspects of this invention will be readily apparent from the detailed description below and the appended drawings, which are meant to illustrate and not to limit the invention, and in which.

DETAILED DESCRIPTION OF THE INVENTION

Figure 1:
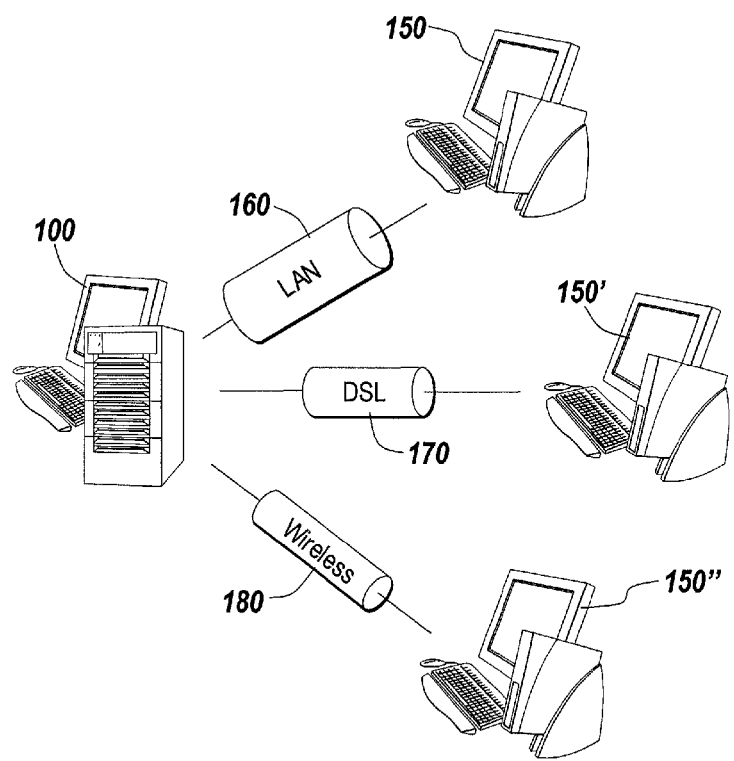
FIG. 1 is a diagrammatic view of one embodiment of a networked system having multiple consumer nodes in communication with a source node.

Referring now to FIG. 1, a networked system having a source node 100 in communication with a number of consumer nodes 150, 150', 150" is depicted. As shown in FIG. 1, the consumer nodes 150, 150', 150" may communicate with the source node 100 via networks of differing bandwidth. In the embodiment shown in FIG. 1 consumer node 150 communicates with the source node 100 via a high-bandwidth network 160, such as a local area network (LAN). Consumer node 150" communicates with the source node 100 via a low-bandwidth network 180, such as a wireless network. Consumer node 150' communicates with the source node 100 via a network 170 having bandwidth between the low-bandwidth network 180 and the high-bandwidth network 160, such as a Digital Subscriber Line (DSL) connection. Although only one source node 100 and three consumer nodes 150, 150', 150" are depicted in the embodiment shown in FIG. 1, it should be understood that the system may provide multiple ones of any or each of those components. For example, in one embodiment, the system includes multiple, logically-grouped source nodes 100, each of which may be available to provide data to a consumer node 150, 150', 150". In these embodiments, the logical group of source nodes 100 may be referred to as a "server farm" or "content farm." In other embodiments, the source node 100 is a multi-user server having a virtual frame buffer, i.e., a presentation server.

The network connections 160, 170, 180 between the consumer nodes 150, 150', 150" and the source node 100 can be local area networks (LAN), metropolitan area networks (MAN), or a wide area network (WAN) such as the Internet. The source node 100 and the consumer nodes 150, 150', 150" may connect to the networks 160, 170, 180 through a variety of connections including standard telephone lines, LAN or WAN links (e.g., T1, T3, 56 kb, X.25), broadband connections (ISDN, Frame Relay, ATM), and wireless connections. Connections between the source node 100 and the consumer nodes 150, 159', 150" may use a variety of data-link layer communication protocols (e.g., TCP/IP, IPX, SPX, NetBIOS, NetBEUI, SMB, Ethernet, ARCNET, Fiber Distributed Data Interface (FDDI), RS232, IEEE 802.11, IEEE 802.11a, IEE 802.11b, IEEE 802.11g and direct asynchronous connections). Although shown in FIG. 1 as separate networks, networks 160, 170, 180 may be combined in a single physical network.

Figure 2A:
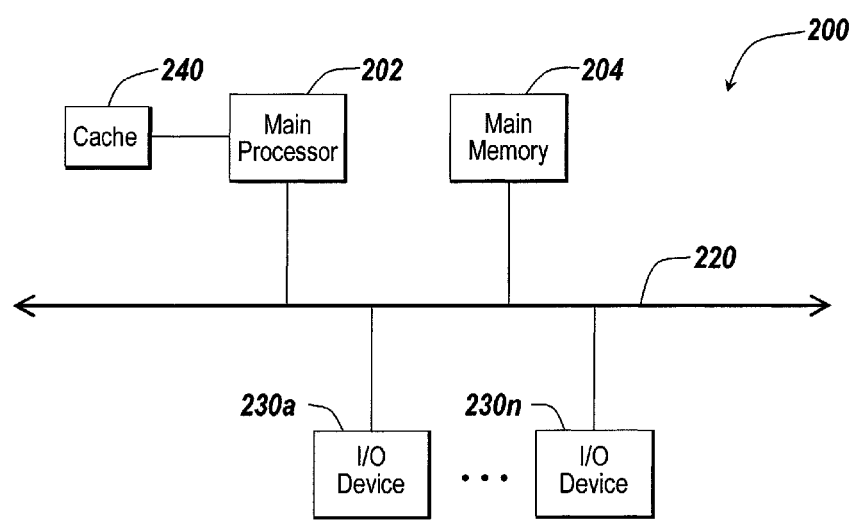
FIGS. 2A and 2B are block diagrams depicting embodiments of computers useful in connection with the present invention.
Figure 2B:
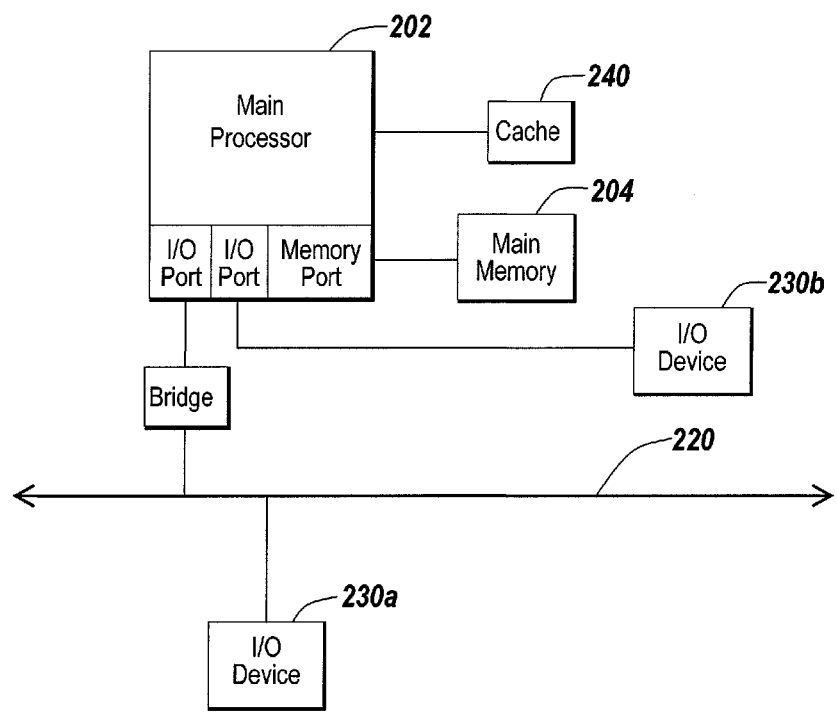

In many embodiments, the source node 100 and the consumer nodes 150, 150', 150" are provided as personal computer or computer servers, of the sort manufactured by the Hewlett-Packard Corporation of Palo Alto, Calif. or the Dell Corporation of Round Rock, Tex. FIGS. 2A and 2B depict block diagrams of a typical computer 200 useful as the source node 100 and the consumer nodes 150, 150', and 150". As shown in FIGS. 2A and 2B, each computer 200 includes a central processing unit 202, and a main memory unit 204. Each computer 200 may also include other optional elements, such as one or more input/output devices 230a-230n (generally referred to using reference numeral 230), and a cache memory 240 in communication with the central processing unit 202.

The central processing unit 202 is any logic circuitry that responds to and processes instructions fetched from the main memory unit 204. In many embodiments, the central processing unit is provided by a microprocessor unit, such as: the 8088, the 80286, the 80386, the 80486, the Pentium, Pentium Pro, the Pentium II, Pentium III, Pentium IV, Pentium M, the Celeron, or the Xeon processor, all of which are manufactured by Intel Corporation of Mountain View, Calif.; the 68000, the 68010, the 68020, the 68030, the 68040, the PowerPC 601, the PowerPC604, the PowerPC604e, the MPC603e, the MPC603ei, the MPC603ev, the MPC603r, the MPC603p, the MPC740, the MPC745, the MPC750, the MPC755, the MPC7400, the MPC7410, the MPC7441, the MPC7445, the MPC7447, the MPC7450, the MPC7451, the MPC7455, the MPC7457 processor, all of which are manufactured by Motorola Corporation of Schaumburg, Ill.; the Crusoe TM5800, the Crusoe TM5600, the Crusoe TM5500, the Crusoe TM5400, the Efficeon TM8600, the Efficeon TM8300, or the Efficeon TM8620 processor, manufactured by Transmeta Corporation of Santa Clara, Calif.; the RS/6000 processor, the RS64, the RS 64 II, the P2SC, the POWER3, the RS64 III, the POWER3-II, the RS 64 IV, the POWER4, the POWER4+, the POWER5, or the POWER6 processor, all of which are manufactured by International Business Machines of White Plains, N.Y.; or the AMD Opteron, the AMD Athalon 64 FX, the AMD Athalon, or the AMD Duron processor, manufactured by Advanced Micro Devices of Sunnyvale, Calif.

Main memory unit 204 may be one or more memory chips capable of storing data and allowing any storage location to be directly accessed by the microprocessor 202, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM).

In the embodiment shown in FIG. 2A, the processor 202 communicates with main memory 204 via a system bus 220 (described in more detail below). FIG. 2B depicts an embodiment of a computer system 200 in which the processor communicates directly with main memory 204 via a memory port. For example, in FIG. 2B the main memory 204 may be DRDRAM.

FIGS. 2A and 2B depict embodiments in which the main processor 202 communicates directly with cache memory 240 via a secondary bus, sometimes referred to as a "backside" bus. In other embodiments, the main processor 202 communicates with cache memory 240 using the system bus 220. Cache memory 240 typically has a faster response time than main memory 204 and is typically provided by SRAM, BSRAM, or EDRAM.

In the embodiment shown in FIG. 2A, the processor 202 communicates with various I/O devices 230 via a local system bus 220. Various busses may be used to connect the central processing unit 202 to the I/O devices 230, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is an video display, the processor 202 may use an Advanced Graphics Port (AGP) to communicate with the display. FIG. 2B depicts an embodiment of a computer system 200 in which the main processor 202 communicates directly with I/O device 230b via HyperTransport, Rapid I/O, or InfiniBand. FIG. 2B also depicts an embodiment in which local busses and direct communication are mixed: the processor 202 communicates with I/O device 230a using a local interconnect bus while communicating with I/O device 230b directly.

A wide variety of I/O devices 230 may be present in the computer system 200. Input devices include keyboards, mice, trackpads, trackballs, microphones, and drawing tablets. Output devices include video displays, speakers, inkjet printers, laser printers, and dye-sublimation printers. An I/O device may also provide mass storage for the computer system 200 such as a hard disk drive, a floppy disk drive for receiving floppy disks such as 3.5-inch, 5.25-inch disks or ZIP disks, a CD-ROM drive, a CD-R/RW drive, a DVD-ROM drive, tape drives of various formats, and USB storage devices such as the USB Flash Drive line of devices manufactured by Twintech Industry, Inc. of Los Alamitos, Calif.

In further embodiments, an I/O device 230 may be a bridge between the system bus 220 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

General-purpose desktop computers of the sort depicted in FIGS. 2A and 2B typically operate under the control of operating systems, which control scheduling of tasks and access to system resources. Typical operating systems include: MICROSOFT WINDOWS, manufactured by Microsoft Corp. of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, among others.

In some embodiments the consumer node 150, 150', 150" is a mobile device, such as a JAVA-enabled cellular telephone or personal digital assistant (PDA), such as the i55sr, i58sr, i85s, i88s, i90c, i95cl, or the im11000, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In other embodiments in which the client device 140 is mobile, it may be a personal digital assistant (PDA), such as the Tungsten W, the VII, the VIIx, the i705, or a combination PDA/telephone device such as the Treo 180, Treo 270, Treo 600, or Treo 650 all of which are manufactured by palmOne, Inc. of Milpitas, Calif.

In these embodiments, the consumer nodes 150, 150', 150" connect to the source node 100 using any one of a number of well-known protocols from the GSM or CDMA families, such as W-CDMA. These protocols support commercial wireless communication services and W-CDMA, in particular is the underlying protocol supporting i-Mode and mMode services, offered by NTT DoCoMo.

Figure 3:
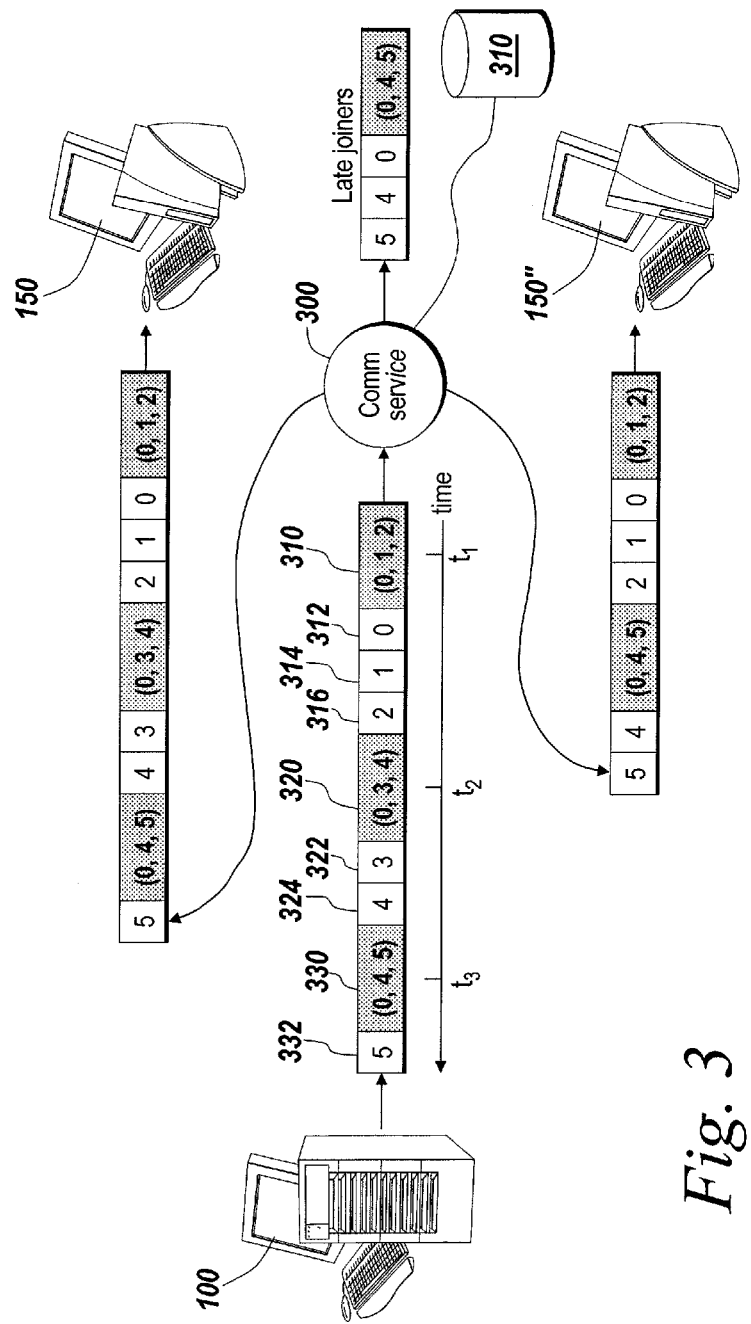
FIG. 3 is a block diagram depicting packet flow in one embodiment of an architecture for synchronizing data sets between a source node and a plurality of consumer nodes in a bandwidth-adaptive manner.

FIG. 3 depicts a block diagram of a system for synchronizing a data set between the source node 100 and a plurality of consumer nodes 150, 150', 150", as well as the packet flow in a system during operation. As shown in FIG. 3, the system includes a communications service 300 with which the source node 100 and the plurality of consumer nodes 150, 150', 150" communicate. The source node 100 and the consumer nodes 150, 150', 150" may be located behind respective firewalls (not shown in FIG. 3). The source node 100 and the consumer nodes 150, 150', 150" make outgoing socket connections to the communications service 300. In some embodiments, the communications service 300 maintains state for each connection to a consumer node 150, 150', 150" in the form of socket descriptors. In other embodiments, the source node 100 and the communications service 300 may be provided as the same physical device. In these embodiments, the source node 100 and the communications service 300 operate on the same hardware in a time-shared manner. Data may be shared between the source node 100 and the communications service 300 using any one of a number of techniques, such as pipe objects or shared memory.

FIG. 3 depicts an embodiment of a system in which the plurality of nodes includes a node annotating a dynamic data set. The node may include an interception subsystem, a transceiver subsystem, and a display subsystem. The node may be a host node 100 or a consumer node 150.

The interception subsystem acquires at least one input from a human interface device, the input representing a change to a dynamic data set. In one embodiment, the interception subsystem further includes a mouse listener. In some embodiments, a user of the node annotating the dynamic data set may use a human interface device, such as a mouse, to input the change to the dynamic data set representing the annotation. In one of these embodiments, the interception subsystem uses the mouse listener to acquire inputs representing a change to a presentation from a human interface device.

The transceiver subsystem transmits the at least one input to a synchronization engine for presentation to a plurality of nodes. In one embodiment, the transceiver subsystem receives the at least one input from the interception subsystem. In some embodiments, the transceiver subsystem receives from the synchronization engine a plurality of data packets representing a second change to the dynamic data set. In one of these embodiments, the transceiver subsystem transmits the second change to the dynamic data set to the display subsystem for presentation to a user of the node.

The display subsystem, which is in communication with the transceiver subsystem, receives the plurality of data packets and displaying the plurality of data packets to a user. In some embodiments, the display subsystem displays to the user of the node a cursor represented by an icon selected from a plurality of icons, responsive to the plurality of data packets. In one of these embodiments, the display subsystem displays a cursor represented by an icon of a drawing tool, the tool chosen responsive to a type of annotation made by the user. In another of these embodiments, the icon represents a highlighter. In still another of these embodiments, the icon represents a laser pointer. In yet another of these embodiments, the icon represents a pen.

The source node 100 may code the current state of a dynamic data set, such as screen data, as a set of data packets. In some embodiments, this coding process is straightforward. For example, in the case where the dynamic data set is screen data, data packets may be coded by storing pixel values for a predetermined portion of the screen in the data packet. In some embodiments, the source node 100 compresses the data stored in the data packets. In still other embodiments, the source node 100 encrypts the data stored in the data packets.

In still further embodiments, the source node 100 both encrypts and compresses data stored in the data packets. As the dynamic data set changes, the source node updates the set of data packets comprising the current state of the data set.

The source node 100 transmits the current state of the dynamic data set to the communications service 300 in a bandwidth-adaptive manner. In one embodiment, this is achieved by requiring the source node 100 to possess a transmission token before beginning transmission of the current state of the data set. In this embodiment, the source node 100 and the communications service exchange a limited number of transmission tokens, e.g., five. In other embodiments, the communication service 300 transmits a message to the source node 100 to notify the source node 100 when it can send another data set update.

As shown in FIG. 3, the communications service 300 may also include a data storage element 310, such as random-access memory, a disk drive, a disk array, a rewriteable optical drive, or some other form of memory element that allows access to stored data. The storage element 310 enables the communications service 310 to store metadata information and data packets received from the source node 100 in between update requests from various consumer nodes 150, 150', 150". In addition, the storage element 310 can be used to maintain a historical record of metadata information and data packets transmitted from the source node 100. In other embodiments, the storage element 310 may also store the data packets transmitted to a respective consumer node 150, 150', 150".

In some embodiments, the communications service 300 depicted in FIG. 3 comprises a receiving subsystem, a synchronization engine, and a transmission subsystem. In one of these embodiments, the receiving subsystem receives at least one metadata packet identifying at least one data packet representing a current state of a dynamic data set and at least one data packet identified by the received at least one metadata packet.

In another of these embodiments, the synchronization engine selects one of the at least one metadata packets and the at least one data packet. The synchronization engine may select one of the at least one metadata packets and the at least one data packet in response to a request received from a node.

In still another of these embodiments, the transmission subsystem transmits the selected one of the at least one metadata and the at least one data packet. The transmission subsystem may transmit the selected one of the at least one metadata packet and the at least one data packet to a node in a plurality of nodes.

The source node 100 creates metadata information that identifies each of the data packets representing the current state of the dynamic data set. In the embodiment shown in FIG. 3, the metadata information comprises a metadata packet 310, 320, 330. Metadata packet 310 is created at time t1, and indicates that the state of the dynamic data set at time t1 is represented by data packet 0, data packet 1, and data packet 2. Similarly, metadata packet 330 indicates that state of the dynamic data set at time t2 is represented by data packet 0, data packet 4, and data packet 5. In other embodiments, instead of creating metadata packets that store metadata information, metadata information is included in data packets. For example, each data packet comprising a data set update may include a "metadata information header" identifying the update set with which the data packet is associated.

As shown in FIG. 3, the source node 100 transmits metadata information 310 to the communications service 300 followed by the data packets identified by the metadata information 310. Thus, the source node 100 transmits to the communications service 300 data packet 0 312, data packet 1 314, and data packet 2 316 following the metadata packet 310. At time t2, the source node 100 transmits to the communications service 300 metadata packet 320, which indicates that the state of the data set at time t2 is represented by data packet 0, data packet 3, and data packet 4. The source node 100 then transmits data packet 3 322 and data packet 4 334 to the communications service 300. The source node 100 does not retransmit data packet 0 to the communications service 300 since that data packet was transmitted in connection with the first metadata packet 310. Similarly, at time t3 the source node 100 transmits to the communications service 300 a metadata packet 330 that indicates the current state of the dynamic data set is represented by data packet 0, data packet 4, and data packet 5. Since the source node 100 already transmitted data packet 0 to communications service 300 following the first metadata packet 310 and data packet 4 following the second metadata packet 320, the source node 100 only transmits data packet 5 332 following the third metadata packet 330.

As described above in connection with flow control between the source node 100 and the communications service 300, flow control between the consumer nodes 150, 150', 150" and the communications service 300 may be token-based or message-based. For ease of reference, the remaining description will assume that the flow control method is based on messages. However, the same advantages of the invention can be obtained in a system relying on transmission tokens.

FIG. 3 depicts an embodiment of a system in which consumer node 150, communicates with the communications service 300 via a high-bandwidth connection. In this case, the consumer node 150 requests data set updates frequently enough that the communication service 300 transmits to the consumer node 150 a stream of metadata information and data packets identical to the stream of metadata information and packets received by the communications service 300 from the source node 100. Also as shown in FIG. 3, the consumer node 150", which communicates with the communications service 300 via a low-bandwidth connection, requests data set updates less frequently and, therefore, receives a different stream of packets from the communications service 300 than the communications service 300 receives from the source node 100. As shown in FIG. 3, the communications service 300 transmits the first metadata packet 310 and data packets 0-3, 312, 314, 316 to the consumer node 150". The next metadata packet received by the consumer node 150" is the third metadata packet 330, which indicates that the state of the dynamic data set is represented by data packet 0, data packet 4, and data packet 5. Since the consumer node 150" has not yet received data packet 4 and data packet 5, the communications service 300 transmits those data packets to the consumer node 150".

In some embodiments, the consumer node 150 generates a plurality of data packets representing a change to a dynamic data set. In one of these embodiments, the consumer node 150 generates the plurality of data packets in the same manner described above for generation of the data packets by the source node 100. In another of these embodiments, the change to the dynamic data set represents an annotation generated by a user of the consumer node 150. In still another of these embodiments, the source node 100 receives the plurality of data packets and transmits the received plurality of data packets to the communications service 300. The source node 100 may receive the plurality of data packets in an encrypted form.

In some of these embodiments, a synchronization engine residing on the communications service 300 generates metadata information representing the difference between the dynamic data set and the plurality of received data packets. In others of these embodiments, the source node 100 creates the metadata information, as described above. In still others of these embodiments, the consumer node 150 generates the metadata information. In yet others of these embodiments, the communications service 300 transmits the metadata information and the plurality of data packets to the plurality of nodes.

FIG. 3 also depicts the packet stream sent to a consumer node that "joins late." As shown in FIG. 3, a consumer that joins at time t3 will receive the third metadata packet 330, as well as all the data packets identified by the third metadata packet. The data packets transmitted to the consumer node 150, 150', 150" by the communications service 300 may be retrieved from the storage element 310, recently received from the source node 100, or some combination of the two.

Delivery of data set updates from the communications service 300 may be performed using a "push" model, a "pull" model, or an "atomic push" model. In the "push" models, the communication service 300 transmits metadata information and data packets to the consumer node 150, 150', 150". The difference between the "push" model and the "atomic push" model is that, in the "atomic push" model, the communications service 300 commits to transmit every data packet identified by transmitted metadata information before beginning transmission of another data set. There is no such commitment in the "push" model, which means that data packets not successfully transmitted from a previous data set update may never be sent to the consumer node 150, 150', 150". In the "pull" model, the consumer node 150, 150', 150" receives from the communications service 300 the metadata information and then requests specific data packets from the communications service 300.

In certain embodiments, the information in metadata packets is encoded incrementally. In these certain embodiments, the "wire" representations of metadata packets may differ despite the fact that they encode the same information. A short example shows why this is the case. Over time, the source node 100 sends three metadata packets to the communications service 300. The contents of the metadata packets are sets of data packet numbers (1, 2, 3), (2, 3, 4) and (3, 4, 5). On the "wire," each set is represented as a delta from the previous set. Thus, the source node 100 transmits the following metadata packets to the communications service 300: (1, 2, 3), (−1, +4) and (−2, +5), where '−' and '+' indicate removal or addition of a packet number from/to the previous set. If a consumer node 150 skips the contents of the second metadata packet, it receives metadata information describing sets (1, 2, 3) and (3, 4, 5). On the "wire," these two sets are represented incrementally as (1, 2, 3) and (−1, +4, −2, +5). While the source node 100 transmitted the contents of the second metadata packet to the communications service 300 as (−2, +5), the communications service 300 transmitted the same information to the consumer node 150 as (−1, +4, −2, +5).

Figure 4:
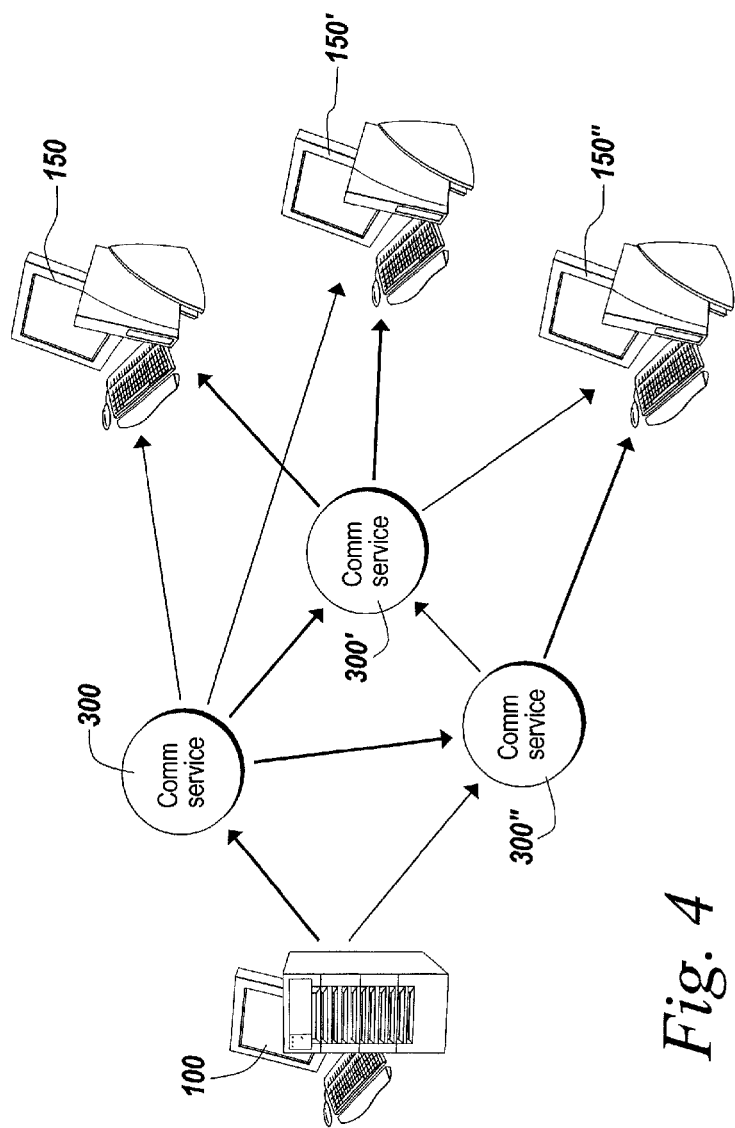
FIG. 4 a block diagram of an embodiment of an architecture for synchronizing data sets between a source node and a plurality of consumer nodes in a bandwidth-adaptive manner.

FIG. 4 depicts another embodiment of a system for synchronizing a data set between a source node 100 and one or more consumer nodes 150, 150', 150" that includes multiple communications services 300, 300', 300" (generally referred to as 300). As shown in FIG. 4, the source node communicates with more than one communications service 300. Similarly, each consumer node 150, 150', 150" may also communicate with one or more communication services 300. The communication services 300 also communicate in a peer-to-peer fashion among themselves.

In this embodiment, each pair of communication services 300 agrees between themselves on a direction for data flow. For example, communication service 300 and communication service 300' may agree between themselves that, for the purposes of their point-to-point link, communication service 300 is the "sender" and communication service 300' is the "receiver," meaning that the "sender" will perform the role of the communication service 300 described in connection with FIG. 3 and the "receiver" will perform the role of the consumer node 150 described in connection with FIG. 3. The communication server 300', however, will perform the role of a "sender" when communicating with consumer nodes 150, 150', 150"

FIG. 4 also depicts an embodiment of a system for synchronizing presentation of a dynamic data set to a plurality of nodes, including a host node 100 and a communications service 300. The host node 100 transmits at least one metadata packet identifying a plurality of data packets that represent a current state of a dynamic data set and transmitting at least one of the identified data packets. The communications service 300, in communication with the host node 100, selects one of the at least one metadata packets and the at least one data packet for transmission to a second node 150 in the plurality of nodes.

The host node 100 transmits at least one metadata packet identifying a plurality of data packets that represent a current state of a dynamic data set and transmitting at least one of the identified data packets. In one embodiment, the host node 100 transmits a plurality of metadata packets. In this embodiment, each of the plurality of metadata packets represents one state of the dynamic data set. In some embodiments, the host node 100 encrypts the at least one data packet before transmission. In other embodiments, the host node 100 received the plurality of metadata packets and the plurality of data packets from a consumer node 150.

In some embodiments, a user of the consumer node 150 makes an annotation to a presentation, changing the state of the dynamic data set. In one of these embodiments, the identified data packets represent the annotation to the dynamic data set. In another of these embodiments, the plurality of metadata packets indicates the state of the dynamic data. In one embodiment, the consumer node 150 transmits the plurality of metadata packets and the plurality of data packets to the host node 100.

The communications service 300, in communication with the consumer node, selects one of the at least one metadata packets and the at least one data packet for transmission to a consumer node 150 in the plurality of nodes. In one embodiment, the communications service 300 receives the at least one metadata packets and the at least one data packet from the host node 100.

In some embodiments, the communications service 300 transmits the at least one metadata packet and the at least one data packet to a second node in response to a request for the current state of the dynamic data set. In one of these embodiments, the consumer node 150 requests the current state of the dynamic data set from the communications service 300. In another of these embodiments, the second node 100 is a host node 100. In still another of these embodiments, the communication service selects one of the at least one metadata packet and the at least one data packet in response to the request made by the second node.

In some embodiments, the communications service 300 further comprises a memory element. In one of these embodiments, the communications service 300 stores the received at least one metadata packet in the memory element. In another of these embodiments, the communications service stores the received at least one data packet in the memory element. In still another of these embodiments, the communications service stores in the memory element information regarding transmission of packets to a node.

The present invention may be provided as one or more computer-readable programs embodied on or in one or more articles of manufacture. The article of manufacture may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include C, C++, C#, or JAVA. The software programs may be stored on or in one or more articles of manufacture as object code.

EXAMPLES

The following examples of content-sharing systems are intended to illustrate the various ways in which the described systems and methods can be used and not to limit the scope of the described invention.

Example 1

The described systems and methods can be used to implement a system for sharing screen data that allows several client machines to display the screen data from a single server. This system is useful in a number of broadcast or "multicast" contexts and, in particular, it is useful in a conferencing context to allow multiple individuals to view the same graphical data during the conference.

Figure 5:
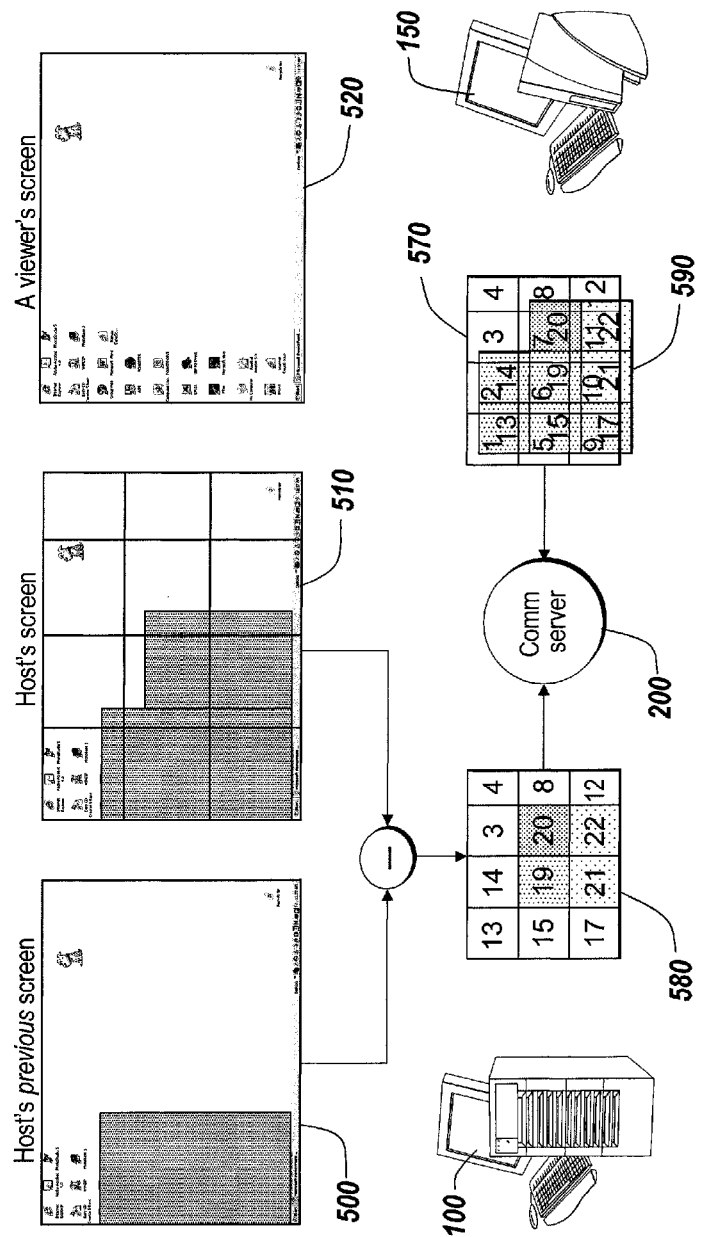
FIG. 5 is a diagrammatic view of a system for sharing screen data.

FIG. 5 depicts diagrammatically a system for sharing screen data. As shown in FIG. 5, a host server 100 monitors its screen state. In the embodiment shown in FIG. 5, the host server 100 subdivides its screen into 12 tiles, although any number of tiles may be used to fully represent the screen of the host server 100. In some embodiment the tiles are each the same size, that is, each tile represents the same number of screen pixels. In other embodiments, such as the embodiment shown in FIG. 5, some of the tiles have sizes different from other tiles. In still other embodiments, a tile may overlap another tile or, as shown in FIG. 5, tiles may by non-overlapping.

As shown in FIG. 5, the host server's previous screen 500 is represented by a first set of tiles (not shown), which are coded as a first set of data packets: 13, 14, 3, 4, 15, 6, 7, 8, 17, 10, 11, and 12. If the host server 100 possesses a transmission token, it transmits these twelve data packets to the communications server 200, as described above.

At a second point in time, the host server's screen 510 has changed. The host server 100 identifies the particular tiles that have changed states, and creates a coded packet for each tile that has changed, i.e., data packets 19, 20, 21, and 22. If the host server 100 did not possess a transmission token but now receives one, the host server 100 will transmit the updated twelve data packets to the communications server 200, i.e., data packets 13, 14, 3, 4, 15, 19, 20, 17, 21, 22, and 12. If the host server has already transmitted the data packets representing the state of the screen 500, then the host server 100 need only transmit to the communications server 200 data packets 19, 20, 21, and 22. In this manner, transmission of screen data between the host server 100 and the communications server 200 is performed in a bandwidth-adaptive manner.

In some embodiments, the host server 100 encrypts the data packets transmitted to the communications server 200. In other embodiments, the host server 100 compresses the data packets sent to the communications server 200. In still other embodiments, the host server 100 both encrypts and compresses the data packets.

In many embodiments, the communications server 200 maintains a copy of each tile that comprises the most recent state of the server node screen. In some embodiments, each tile is associated with a timestamp when transmitted to the communication service 200. In other embodiments, each tile is associated with a number that monotonically increases with each new tile transmitted to the communications service 300.

The communications server 200 composes an update for a viewer node 150 as often as the bandwidth of the network connecting the viewer node 150 to the communications server 200 allows. As shown in FIG. 5, the viewer's screen 520 displays screen data from a point in time before the host's previous screen 500. That is, the host server's display data has changed twice (represented by screen 500 and screen 510) since the last time the viewer node 150 has requested an update. Data packet array 570 shows the data packets comprising the screen data currently displayed by the viewer node 150. Data packet array 590 depicts the data packets that the communications server 200 must transmit to the viewer node 150 in order to update the viewer's screen 520 to the state of the host's screen 510. As described above, the communications server 200 transmits metadata information to the viewer node 150 identifying eight data packets: data packets 13, 14, 15, 19, 20, 17, 21, and 22. In some embodiments, the metadata information explicitly identifies which tile replaces which other tile, perhaps by describing the position of the new tile. The communications server 200 then transmits the packets representing the new tiles to the viewer node.

In another embodiment, the communication service 200 responds to an update request from the viewer node 150 by transmitting to the viewer node 150 every data packet having a timestamp newer than the timestamp of the viewer's screen. In some of these embodiments, the communication service 200 does not fully receive and store a set of data packets comprising a screen update before sending the update to the viewer node 150. In these embodiments, the communications service 300 sets the timestamp for each packet identified by metadata information as comprising the screen update to the same value. Then, as data packets arrive the communications service 300 streams those packets to the viewer node 150.

In one particular embodiment, metadata information is formatted into packets and metadata packets are associated with monotonically increasing numbers. As described above, each metadata packet describes the set of tiles comprising the current screen display state. In this embodiment, the communications service 300 stores, for each consumer node 150, the number of the latest metadata packet that has been transmitted to that consumer node 150, as well as the set of all data packets that have been delivered to the consumer node. When the communications service 300 determines that it is time to send an update to a consumer node 150, or upon receiving a request from a consumer node 150 for a screen update, the communications service first determines if the latest metadata packet (that is, the metadata packet having the highest number associated with it) has been transmitted to the consumer node 150. If not, the communications service 300 transmits the most recent metadata packet to the consumer node 150. The communications service 300 also transmits the set of data packets identified by the metadata packet, unless a particular data packet has already been transmitted to the consumer node 150.

Figure 6:
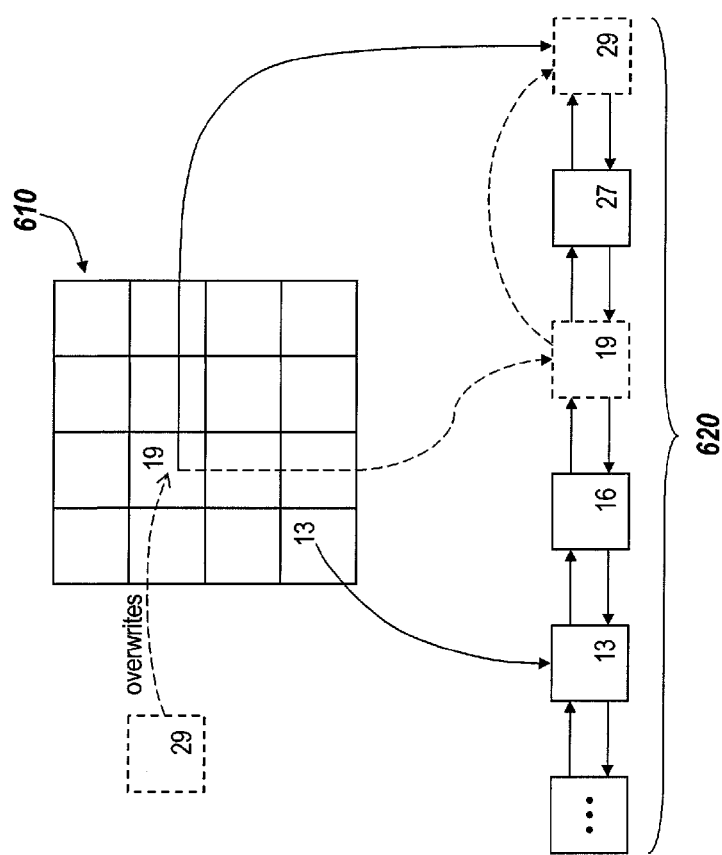
FIG. 6 is a diagrammatic representation of a data structure useful in a system for sharing graphical screen data.

In another embodiment, the set of tiles (i.e., data packets) that must be transmitted to a consumer node is computed by associating each tile with a timestamp and identifying all visible tiles whose timestamps are newer than the newest tile already received by the consumer node 150. FIG. 6 depicts diagrammatically a data structure enabling efficient replacement of a display tile by the communications service 300 and given a timestamp, identification of which tiles are out-of-date with respect to a given consumer node 150. All tiles comprising a screen 610 are stored in a doubly-linked list 620 sorted by timestamp and indexed by tile location in the screen. As shown in FIG. 6, when new tile 29 overwrites old tile 19, tile 19 is removed from the list and new tile 29 is inserted at the head of the list. When a viewer node 150 requests a screen update, the communications service 300 iterates through the list of tiles 620 and transmits tiles to the viewer node until it encounters a tile with a timestamp older than the newest tile on the viewer node screen.

Example 2

In another example the described synchronization systems and methods are used to implement a chat system. In this system, a chat participant adds text or other content to an on going session and identifies the added content as a data packet. In one embodiment, the participant also associates a timestamp with the added content. The participant then transmits metadata information identifying the current state of the chat. In one embodiment, the metadata information identifies the current state of the chat session as the recently added packet together with every previous data packet added to the chat.

The participant transmits the metadata information together with a data packet representing the recently added content. In one embodiment, the metadata information and data packet are pushed to a receiving node, as described above. Recipients of the metadata information and data packet merge the received data packet with chat data packets already received in the order the data packets are received. In another embodiment, the recipient merges the chat data packets based on the time the data packet was sent. In still another embodiment, the recipient merges the data packets based on the timestamp associated with the data packet.

A "late joiner" to the chat session will receive metadata information identifying all data packets representing the chat session. The late joiner will either request (i.e., pull) or be sent (i.e., push) all the data packets identified by the metadata information and will display in them in timestamp order.

Example 3

In another example, the synchronization systems and methods described above may be used to implement a remote presentation system. In this example, a presenter converts a slide presentation into a series of page-by-page images. As the presenter displays a slide, the page image representing that slide is transmitted to all viewers. In many embodiments, each slide is represented by multiple data packets.

In this example, the presenter atomically pushes the currently displayed slide by atomically pushing metadata information identifying each data packet representing the slide and pushing each data packet not yet transmitted to the receiver. The presenter may also push the previous slide and the next slide. In further embodiments, viewers may "pull" other pages in the presentation if extra bandwidth is available. Information that may be inserted into a laser pointer data packet includes, x coordinate, y coordinate, time, document, or page number.

In addition to multicasting slide presentation, this exemplary embodiment may be used to share other page-based documents. This exemplary embodiment may also support a "laser pointer" feature in which the position of a presenters "laser pointer" is also transmitted to all viewers, allowing the presenter to direct viewer's attention to areas of interest in the document.

Example 4

In still another example, the synchronization methods and systems described above may be used to implement a system allowing multiple users to annotate a document. In this example, the annotation may be made by a host node or a consumer node. If the consumer node makes the annotation, the annotation data packet may be sent to the host node for transmission to the communications service which may then transmit the annotation data packet to each node in the plurality of nodes.

In this example, each annotation is represented by a data packet. Annotation data packets may include information regarding the time the annotation was made and by whom. Other annotation data packet information may include the document on which the annotation is made, the page number of the document on which the annotation is made, the drawing tool used to make the annotation, the x coordinate of the annotation, or the y coordinate of the annotation. A cursor displayed to a user making an annotation may be represented by an icon depicting various drawing tools, including without limitation, a laser pointer, a highlighter, a stamping tool, an eraser, a cropping tool, a line drawing tool, an arrow drawing tool, a polygon drawing tool, and a pen.

In this example, the metadata information identifies all annotation data packets. In this manner, a "late joiner" will receive all annotations made to the document.

While the invention has been shown and described with reference to specific preferred embodiments, it should be understood by those skilled in the art that various changes in form and detail may be made therein without departing from the spirit and scope of the invention as defined by the following claims.

What is claimed as new and desired to be protected by Letters Patent of the United States is:

1. A method for synchronizing, in a system having a plurality of nodes, presentation of a dynamic data set to the plurality of nodes, the method comprising:

generating, by a host node in a plurality of nodes, a dynamic data set that is shared with the plurality of nodes;

receiving, by the host node from a consumer node in the plurality of nodes, a plurality of data packets representing a change to the dynamic data set, the change to the dynamic data set being an annotation to the dynamic data set made by the consumer node;

transmitting, by the host node to a synchronization engine of a computing device separate from the host node, the plurality of data packets received from the consumer node;

generating, by the synchronization engine, metadata information representing a difference between the dynamic data set and the plurality of data packets, the metadata information identifying a first set of data packets from the plurality of data packets and a second, different set of data packets from the plurality of data packets;

transmitting, by the synchronization engine to the plurality of nodes, the metadata information and the first set of data packets to a first node in the plurality of nodes for use by the first node in synchronizing the presentation of the dynamic data set; and transmitting, by the synchronization engine to the plurality of nodes, the metadata information and the second, different set of data packets to a second node in the plurality of nodes for use by the second node in synchronizing the presentation of the dynamic data set.

2. The method of claim 1, further comprising receiving, by the synchronization engine, a request for a current state of the changing data set.

3. The method of claim 1, wherein at least one of the plurality of data packets is in encrypted form.

4. The method of claim 1, further comprising storing the generated metadata information in a memory device.

5. The method of claim 1, further comprising storing the received plurality of data packets in a memory device.

6. A system for synchronizing presentation of a dynamic data set to a plurality of nodes, the system comprising:
a host node for transmitting a plurality of metadata packets, each metadata packet identifying a plurality of data packets that represent a current state of a dynamic data set, and for separately transmitting at least one of the identified data packets, the host node comprising a processor; and
a communications service in communication with the host node, the communications service for i) selecting one of the metadata packets, ii) selecting a first set and a second, different set of the data packets identified by the selected metadata packet, iii) transmitting the selected metadata packet and the first set of data packets identified thereby to a first consumer node in a plurality of nodes for use by the first consumer node in synchronizing presentation of the dynamic data set, the first consumer node having a first bandwidth connection with the communications service, and iv) transmitting the selected metadata packet and the second, different set of data packets identified thereby to a second consumer node in the plurality of nodes for use by the second consumer node in synchronizing presentation of the dynamic data set, the second consumer node having a second bandwidth connection with the communications service that is different from the first bandwidth connection that the first consumer node has with the communications service;
wherein, in selecting the first set of data packets, the communications service selects all the data packets identified by the selected metadata packet less the data packets already transmitted to the first consumer node and, in selecting the second, different set of data packets, the communications service selects all the data packets identified by the selected metadata packet less the data packets already transmitted to the second consumer node.

7. The system of claim 6, wherein the second consumer node is configured to request the current state of the dynamic data set from the communications service.

8. The system of claim 7, wherein the communication service is configured to select the metadata packet and the second set of the data packets in response to the request made by the second consumer node.

9. The system of claim 6, wherein each of the plurality of metadata packets represents one state of the dynamic data set.

10. The system of claim 6, wherein the communications service comprises a memory element.

11. The system of claim 10, wherein the communications service is configured to store at least one metadata packet in the memory element.

12. The system of claim 10, wherein the communications service is configured to store at least one data packet in the memory element.

13. The system of claim 10, wherein the communications service is configured to store in the memory element information regarding transmission of packets to a node.

14. The system of claim 6, wherein the host node is configured to encrypt at least one data packet before transmission.

15. The system of claim 6, wherein the host node is further configured to receive, from one of the consumer nodes, a plurality of data packets representing a change to the dynamic data set.

16. The system of claim 15, wherein the host node is further configured to transmit, to the communications service, the plurality of data packets received from the one consumer node.

17. The system of claim 15, wherein the change to the dynamic data set is an annotation to the dynamic data set made by the one consumer node.

18. A communications service for synchronizing presentation of a dynamic data set to a plurality of nodes, the service comprising:
a receiving subsystem for receiving a plurality of metadata packets, each metadata packet identifying a plurality of data packets representing a current state of a dynamic data set, and for separately receiving at least one data packet identified by the received metadata packets;
a memory element for storing at least one of the metadata packets and the data packet;
a synchronization engine for selecting i) one of the metadata packets and ii) a first set and a second, different set of the data packets identified by the selected metadata packet; and
a transmission subsystem for transmitting i) the selected metadata packet and the first set of data packets identified thereby to a first consumer node in a plurality of nodes for use by the first consumer node in synchronizing presentation of the dynamic data set, the first consumer node having a first bandwidth connection with the communications service, and ii) the selected metadata packet and the second, different set of data packets identified thereby to a second consumer node in the plurality of nodes for use by the second consumer node in synchronizing presentation of the dynamic data set, the second consumer node having a second bandwidth connection with the communications service that is different from the first bandwidth connection that the first consumer node has with the communications service,
wherein, in selecting the first set of data packets, the synchronization engine selects all the data packets identified by the selected metadata packet less the data packets already transmitted to the first consumer node and, in selecting the second, different set of data packets, the synchronization engine selects all the data packets identified by the selected metadata packet less the data packets already transmitted to the second consumer node.

19. The communications service of claim 18, wherein the synchronization engine is configured to select the metadata packet and a set of the data packets identified thereby in response to a request received from a consumer node.

20. The communications service of claim 18, wherein the receiving subsystem is further configured to receive a plurality of data packets representing a change to the dynamic data set.

21. The communications service of claim 20, wherein the change to the dynamic data set is an annotation to the dynamic data set made by one of the consumer nodes.

* * * * *